(12) United States Patent
Miyamoto et al.

(10) Patent No.: US 9,234,761 B2
(45) Date of Patent: Jan. 12, 2016

(54) VEHICLE COURSE ESTIMATION DEVICE

(75) Inventors: Toru Miyamoto, Susono (JP); Akihide Tachibana, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 546 days.

(21) Appl. No.: 13/499,057

(22) PCT Filed: May 6, 2011

(86) PCT No.: PCT/JP2011/060608
§ 371 (c)(1),
(2), (4) Date: Mar. 29, 2012

(87) PCT Pub. No.: WO2012/153380
PCT Pub. Date: Nov. 15, 2012

(65) Prior Publication Data
US 2013/0218462 A1    Aug. 22, 2013

(51) Int. Cl.
*B60W 30/14*    (2006.01)
*B60W 30/18*    (2012.01)
*G01C 21/34*    (2006.01)

(52) U.S. Cl.
CPC ............. *G01C 21/34* (2013.01); *B60W 30/143* (2013.01); *B60W 30/18154* (2013.01); *B60W 2540/20* (2013.01)

(58) Field of Classification Search
CPC .......... B60W 30/143; B60W 2540/20; B60W 30/18154; G01C 21/34; E21B 49/08
USPC .......................................... 701/527, 400, 437
See application file for complete search history.

(56) References Cited

U.S. PATENT DOCUMENTS

| | | | |
|---|---|---|---|
| 5,832,400 A | 11/1998 | Takahashi et al. | |
| 5,940,010 A * | 8/1999 | Sasaki et al. | 340/901 |
| 6,246,961 B1 | 6/2001 | Sasaki et al. | |
| 2005/0190952 A1 | 9/2005 | Nagasawa et al. | |
| 2006/0178824 A1 | 8/2006 | Ibrahim | |
| 2007/0106470 A1* | 5/2007 | Nakayama et al. | 701/211 |
| 2009/0037071 A1* | 2/2009 | Inoue | 701/96 |

(Continued)

FOREIGN PATENT DOCUMENTS

| | | |
|---|---|---|
| DE | 10 2004 035 571 A1 | 2/2006 |
| DE | 10 2006 005 513 A1 | 8/2006 |

(Continued)

OTHER PUBLICATIONS

International Search Report Issued Jul. 12, 2011 in PCT/JP11/60608 Filed May 6, 2011.

*Primary Examiner* — Rodney Butler
(74) *Attorney, Agent, or Firm* — Oblon, McClelland, Maier & Neustasdt, L.L.P.

(57) ABSTRACT

A vehicle course estimation device which includes: a direction indicator sensor which detects an operating state of a direction indicator of a vehicle; a distance detection section which detects a distance between the vehicle and an intersection located at a travel direction side of the vehicle; a reference speed calculation section which calculates a reference speed, which is a speed for the vehicle to arrive at the intersection after a predetermined time, on the basis of the distance between the vehicle and the intersection located at the travel direction side of the vehicle, which has been detected by the distance detection section, when an operation of the direction indicator is detected by the direction indicator sensor; and a course estimation section which estimates a course of the vehicle on the basis of a speed of the vehicle with respect to the reference speed calculated by the reference speed calculation section.

10 Claims, 9 Drawing Sheets

(56) References Cited

U.S. PATENT DOCUMENTS

| | | | |
|---|---|---|---|
| 2011/0144859 A1* | 6/2011 | Suk et al. | 701/35 |
| 2011/0276242 A1* | 11/2011 | O'Dea et al. | 701/70 |
| 2012/0229268 A1* | 9/2012 | Butlin et al. | 340/465 |

FOREIGN PATENT DOCUMENTS

| | | | |
|---|---|---|---|
| EP | 2 279 889 A1 | 2/2011 | |
| JP | 8 72591 | 3/1996 | |
| JP | 11 353565 | 12/1999 | |
| JP | 2005 147818 | 6/2005 | |
| JP | 2005 222425 | 8/2005 | |
| JP | 2006 154967 | 6/2006 | |
| JP | 2007 148716 | 6/2007 | |
| JP | 2007326521 A | * | 12/2007 |
| JP | 2009-48458 A | | 3/2009 |
| JP | 2010 221962 | 10/2010 | |

* cited by examiner

VEHICLE COURSE ESTIMATION DEVICE

TECHNICAL FIELD

The present invention relates to a vehicle course estimation device which estimates the course of a vehicle.

BACKGROUND ART

In a driving assistance system which provides driving assistance according to the driving behavior of a driver, it is necessary to estimate the course of a vehicle in order to provide driving assistance for the driving operation that the driver wants.

For example, a device of estimating the course of a vehicle by creating a right turn action template from driving data having an accelerator opening, the amount of braking, and a vehicle speed as elements and comparing the driving data of a driver at the time until the vehicle arrives at the intersection with the right turn action template is known as the vehicle course estimation device (for example, Patent Literature 1).

CITATION LIST

Patent Literature

[Patent Literature 1] Japanese Unexamined Patent Application Publication No. 2010-221962

SUMMARY OF INVENTION

Technical Problem

In the device described above, however, the course of a vehicle is estimated using a template. For this reason, when the driving data of a driver deviates from the template due to the influence of a traffic situation or the like, a different course from the course that the driver wants may be estimated.

Therefore, an object of the present invention is to provide a vehicle course estimation device capable of estimating the course of a vehicle accurately.

Solution to Problem

In order to solve the problem described above, a vehicle course estimation device related to the present invention includes: direction indicator detection means for detecting an operating state of a direction indicator of a vehicle; distance detection means for detecting a distance between the vehicle and an intersection located at a travel direction side of the vehicle; reference speed calculation means for calculating a reference speed, which is a speed for the vehicle to arrive at the intersection after a predetermined time, on the basis of the distance between the vehicle and the intersection located at the travel direction side of the vehicle, which has been detected by the distance detection means, when an operation of the direction indicator is detected by the direction indicator detection means; and course estimation means for estimating a course of the vehicle on the basis of a speed of the vehicle with respect to the reference speed calculated by the reference speed calculation means.

In the vehicle course estimation device related to the present invention, the course of a vehicle is estimated on the basis of the speed of the vehicle with respect to the reference speed which is a speed for the vehicle to arrive at the intersection after a predetermined time. Since the course which a vehicle can take physically is limited according to the reference speed, which is a speed for the vehicle to arrive at the intersection after a predetermined time, it is possible to accurately estimate the course of the vehicle by estimating the course of the vehicle on the basis of the speed of the vehicle with respect to the reference speed.

In the vehicle course estimation device related to the present invention, when an operation of the direction indicator is detected by the direction indicator detection means, the reference speed calculation means may calculate the reference speed on the basis of the distance between the vehicle and the intersection located at the travel direction side of the vehicle, which has been detected by the distance detection means, and a fixed time set in advance as the predetermined time.

In this case, since an appropriate reference speed according to the fixed time set in advance is calculated, the course of the vehicle can be accurately estimated.

The vehicle course estimation device related to the present invention may estimate the course of the vehicle on the basis of the presence of a deceleration operation of the vehicle and set determination conditions in determining the presence of the deceleration operation of the vehicle according to the speed of the vehicle with respect to the reference speed.

In this case, since a course transition state of the vehicle can be determined by estimating the course of the vehicle on the basis of the presence of the deceleration operation of the vehicle, the course of the vehicle can be appropriately estimated. In addition, since the required level of the deceleration operation differs depending on the speed of the vehicle with respect to the reference speed, the course of the vehicle can be accurately estimated by setting the determination conditions on the basis of the speed of the vehicle with respect to the reference speed.

In the vehicle course estimation device related to the present invention, when the speed of the vehicle is lower than the reference speed, the course estimation means may set the determination conditions such that determination that a deceleration operation is performed is made more easily than in a case where the speed of the vehicle is not lower than the reference speed.

For example, when changing course, such as turning left or right, deceleration required when the speed of the vehicle is lower than the reference speed is smaller than that required when the speed of the vehicle is higher than the reference speed. Therefore, when the speed of the vehicle is lower than the reference speed, the course estimation means can estimate the course of the vehicle accurately by changing the criterion of determination such that determination that a deceleration operation is performed is made more easily than in the case where the speed of the vehicle is higher than the reference speed.

In the vehicle course estimation device related to the present invention, the course estimation means may also estimate the course on the basis of the amount of steering of the vehicle. In this case, since a course transition state of the vehicle can be determined by estimating the course of the vehicle on the basis of the amount of steering of the vehicle, the course of the vehicle can be appropriately estimated.

In the vehicle course estimation device related to the present invention, the course estimation means may estimate a travel direction of the vehicle at the intersection as the course of the vehicle. In this case, it is possible to estimate the travel direction at the intersection which is useful information when providing driving assistance.

In addition, a vehicle course estimation device related to the present invention includes: direction indicator detection means for detecting an operating state of a direction indicator of a vehicle; avoidance behavior detection means for detecting whether or not an operation of the direction indicator of the vehicle detected by the direction indicator detection means is an operation to avoid another vehicle other than the vehicle; and course estimation means for estimating a course of the vehicle on the basis of a detection result of the avoidance behavior detection means.

In the vehicle course estimation device related to the present invention, the course of a vehicle is estimated on the basis of whether or not the operation of the direction indicator of the vehicle is an operation to avoid another vehicle other than the vehicle. Therefore, since it is appropriately determined whether the operation of the direction indicator of the vehicle is for changing the travel direction of the vehicle or for avoiding another vehicle, the course of the vehicle can be accurately estimated.

In the vehicle course estimation device related to the present invention, the avoidance behavior determination means may detect whether or not the operation of the direction indicator of the vehicle is an operation to avoid another vehicle other than the vehicle on the basis of a position of another vehicle and a position of the vehicle when the operation of the direction indicator is detected by the direction indicator detection means.

In this case, it is determined whether or not the vehicle is doing avoidance action on the basis of the position of another vehicle and the position of the vehicle when the operation of the direction indicator is detected. For example, when passing another vehicle, the direction indicator tends to operate when both vehicles are in the predetermined positional relationship. Thus, it is possible to appropriately detect whether or not a vehicle is doing avoidance action by using the position of another vehicle and the position of the vehicle when the operation of the direction indicator is detected.

In the vehicle course estimation device related to the present invention, the course estimation means may estimate a travel direction of the vehicle at an intersection, which is located at a travel direction side of the vehicle, as a course of the vehicle, and may estimate that the vehicle will not change the travel direction at the intersection when the avoidance behavior detection means detects that the operation of the direction indicator of the vehicle is an operation to avoid another vehicle other than the vehicle.

In this case, when it is detected that the operation of the direction indicator of the vehicle is an operation to avoid another vehicle other than the vehicle, it is estimated that the vehicle will not change the travel direction at the intersection. Thus, by not estimating the operation of the direction indicator for avoiding another vehicle as a travel-direction change at the intersection, estimating the avoidance behavior of another vehicle and the course change at the intersection incorrectly can be prevented. As a result, the course of the vehicle can be accurately estimated.

Advantageous Effects of Invention

According to the present invention, the course of a vehicle can be accurately estimated.

DESCRIPTION OF EMBODIMENTS

Figure 1:
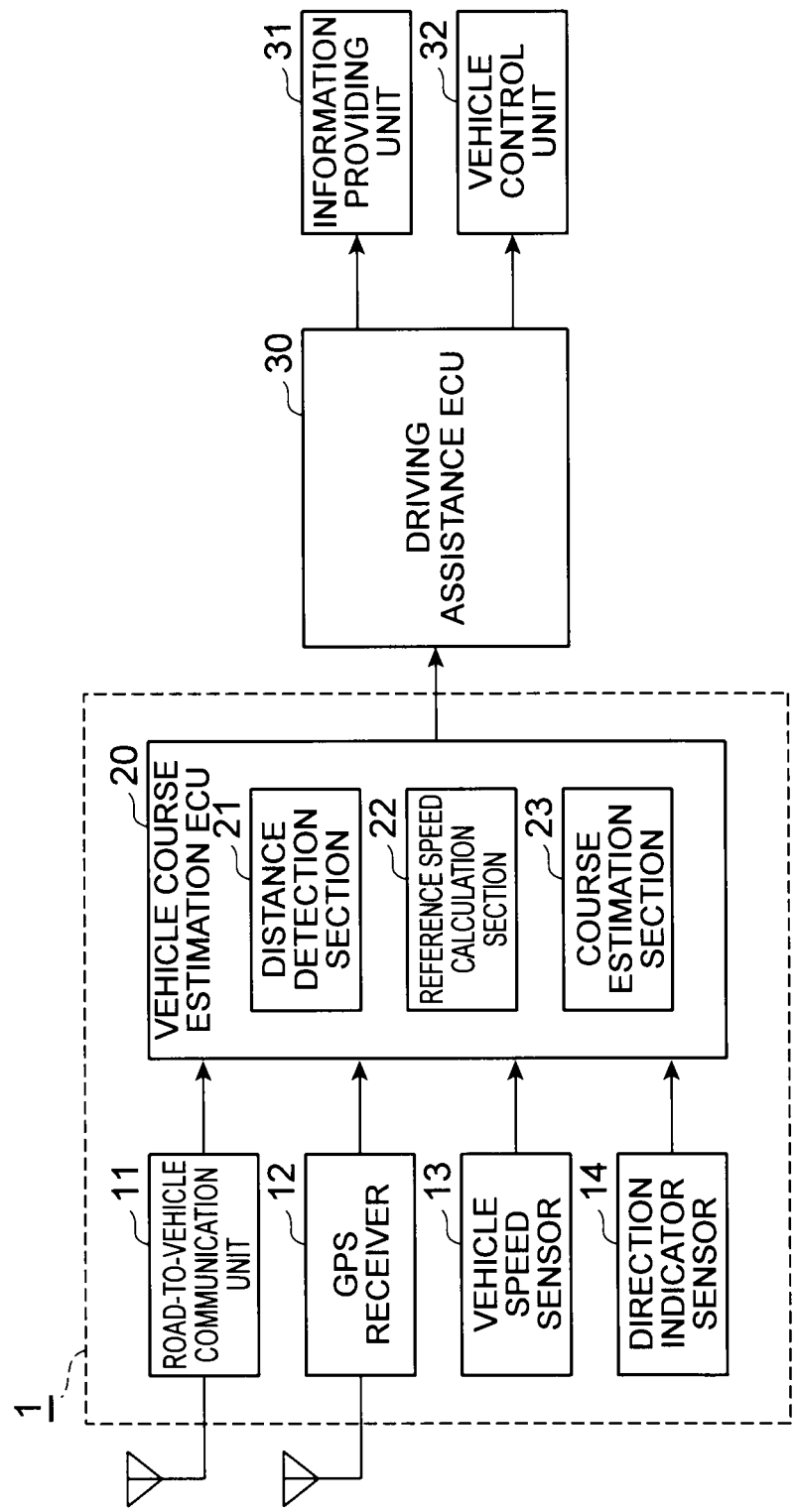
FIG. 1 is a block diagram of a vehicle course estimation device related to a first embodiment.

Hereinafter, preferred embodiment of the present invention will be described in detail with reference to the accompanying drawings. In addition, in the following explanation, the same or corresponding components are denoted by the same reference numerals and repeated explanation thereof will be omitted.

(First Embodiment)

First, a vehicle course estimation device related to a first embodiment will be described. FIG. 1 is a block diagram showing the vehicle course estimation device related to the first embodiment. In this drawing, a vehicle course estimation device 1 includes a road-to-vehicle communication unit 11, a GPS (Global Positioning System) receiver 12, a vehicle speed sensor 13, a direction indicator sensor 14, a vehicle course estimation ECU (Electronic Control Unit) 20, a driving assistance ECU 30, an information providing unit 31, and a vehicle control unit 32.

The road-to-vehicle communication unit 11 is communication means for communicating with a road-to-vehicle communication device T at the infrastructure side, and receives infrastructure information transmitted from the road-to-vehicle communication device T, such as radio communication media. As examples of the infrastructure information, road shape information, information regarding the distance to an intersection, and the like are included. The road-to-vehicle communication unit 11 outputs the received infrastructure information to the vehicle course estimation ECU 20.

The GPS receiver 12 receives and acquires information regarding the current position and the course direction of the vehicle using a GPS (global positioning system). The GPS receiver 12 acquires data of the position, at which the road-to-vehicle communication unit 11 has received the infrastructure information, and outputs the data to the vehicle course estimation ECU 20.

The vehicle speed sensor 13 is a sensor which detects the speed of the vehicle. In addition, the direction indicator sensor 14 is a sensor which detects a lighting state of a direction indicator of the vehicle. Each of the vehicle speed sensor 13 and the direction indicator sensor 14 outputs the acquired detection information to the vehicle course estimation ECU 20.

The vehicle course estimation ECU 20 includes a CPU (Central Processing Unit) which performs arithmetic processing, a ROM (Read Only Memory) and a RAM (Random Access Memory) serving as a storage section, an input signal circuit, an output signal circuit, a power supply circuit, and the like, and performs overall control of the vehicle course estimation device 1. The vehicle course estimation ECU 20 includes a distance detection section 21, a reference speed calculation section 22, and a course estimation section 23.

The distance detection section 21 functions as distance detection means for detecting a distance L between a vehicle and an intersection located at the travel direction side of the vehicle. For example, the distance detection section 21 acquires the information regarding the distance to the intersection, which has been acquired by the road-to-vehicle communication unit 11, and the position information when the GPS receiver 12 receives the infrastructure information from the road-to-vehicle communication unit 11, and detects the distance L between the vehicle and the intersection located at the travel direction side of the vehicle. In addition, referring to the map information (not shown), the distance detection section 21 may detect the distance L between the vehicle and the intersection located at the travel direction side of the vehicle on the basis of the current position of the vehicle acquired by the GPS receiver 12 and the intersection position acquired from the map information.

The reference speed calculation section 22 functions as reference speed calculation means for calculating the reference speed V0 which is a speed for a vehicle to arrive at the intersection after a predetermined time. The reference speed calculation section 22 calculates the reference speed V0 from the following Expression (1) using the distance L between the vehicle and the intersection that is detected by the distance detection section 21 while the direction indicator of the vehicle traveling before the intersection is operating.

$$V0 = L/\tau \quad (1)$$

In the above Expression (1), $\tau$ indicates a time taken to arrive at the intersection. For example, the arrival time $\tau$ is a time taken to arrive at the intersection after a general driver operates a direction indicator. For example, when a driver intends to turn right at the intersection, the arrival time $\tau$ is set to 3 seconds if a general driver operates a direction indicator for right turn at the position 3 seconds before arriving at the intersection. Thus, the arrival time $\tau$ is a fixed value set in advance. That is, the reference speed V0 means a speed of a corresponding vehicle when it is assumed that the vehicle arrives at an intersection after the predetermined time $\tau$.

In addition, the reference speed calculation section 22 may not calculate the reference speed V0 if the distance L between the vehicle and the intersection detected by the distance detection section 21 is larger than a predetermined threshold value Lt when the direction indicator of the vehicle operates. This is because it is thought that the operation of the direction indicator of the vehicle does not mean a change of the travel direction at the intersection when the distance L between the vehicle and the intersection is larger than the predetermined threshold value Lt.

The course estimation section 23 functions as course estimation means for estimating the course of a vehicle. The course estimation section 23 estimates the course of a vehicle by determining whether or not the vehicle is in a physically possible state for turning at the intersection and whether or not the vehicle is doing action trying to transition to the turning state on the basis of the speed of the vehicle with respect to the reference speed V0 calculated by the reference speed calculation section 22.

Figure 2:
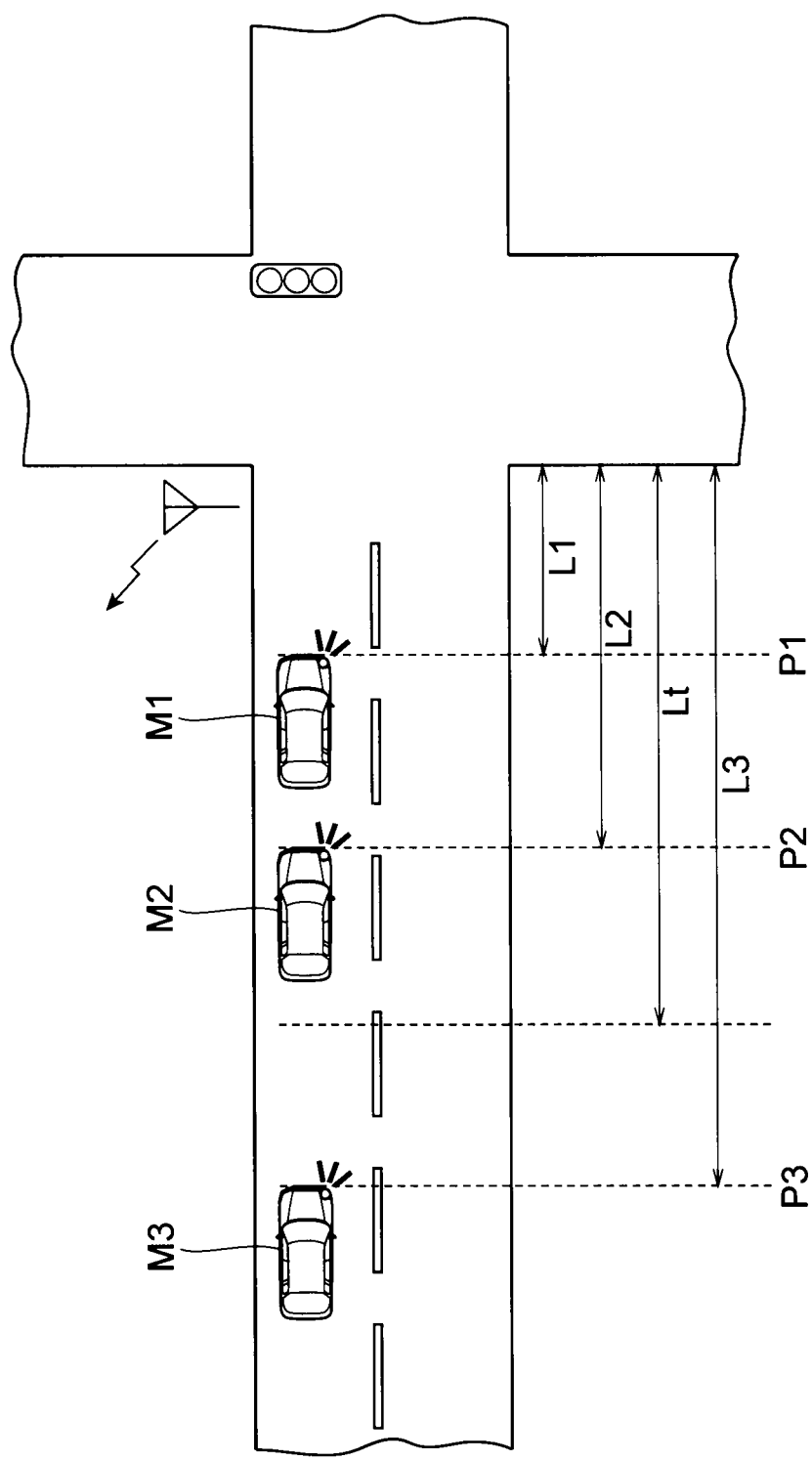
FIG. 2 is a view for explaining processing of estimating the course of a vehicle.

Processing of estimating the course of a vehicle will be described with reference to FIG. 2. FIG. 2 shows a situation where vehicles M1 to M3 with the vehicle course estimation device 1 mounted therein have operated their direction indicators at respective positions P1 to P3. In the case of the vehicle M1 which has operated the direction indicator at the position P1, the distance from the position P1 to the intersection is L1. Accordingly, the reference speed V01 in this case is set to L1/$\tau$. On the other hand, in the case of the vehicle M2 which has operated the direction indicator at the position P2, the distance from the position P2 to the intersection is L2. Accordingly, the reference speed V02 in this case is set to L2/$\tau$. In addition, in the case of the vehicle M3 which has operated the direction indicator at the position P3, the distance from the position P3 to the intersection is L3 which is larger than the predetermined distance Lt. Accordingly, the reference speed may not be calculated, and the reference speed V0 may be calculated after the distance L to the intersection becomes smaller than the predetermined distance Lt.

The course estimation section 23 estimates the course of a vehicle on the basis of the speeds of the vehicles M1 and M2 with respect to the calculated reference speeds V01 and V02. Specifically, for example, when the speeds of the vehicles M1 and M2 are lower than the reference speeds V01 and V02, the course estimation section 23 estimates that the vehicles M1 and M2 will turn left or right. On the other hand, when the speeds of the vehicles M1 and M2 are equal to or higher than the reference speeds V01 and V02, the course estimation section 23 estimates that the vehicles M1 and M2 will go straight without turning left or right. This is because it is determined that the vehicles M1 and M2 are not in a physically possible state for turning at the intersection when the speeds of the vehicles M1 and M2 are equal to or higher than the reference speeds V01 and V02.

In addition, the course estimation section 23 may estimate the course of a vehicle on the basis of the reference speed V0 and the presence of a deceleration operation of the vehicle. Specifically, the course estimation section 23 estimates the course of a vehicle using an accelerator opening, brake pressure, and the like. In addition, the course estimation section 23 can acquire the accelerator opening and the brake pressure on the basis of outputs from a brake pedal sensor and an accelerator pedal sensor (not shown).

In this case, the course estimation section 23 may compare the reference speed V0 with the speed V of the vehicle, for example. When the speed V of the vehicle is equal to or higher than the reference speed V0, the course estimation section 23 may estimate the course of the vehicle depending on whether or not a brake operation is performed. Specifically, when the speed V of the vehicle is equal to or higher than the reference speed V0, the course estimation section 23 estimates that the vehicle will turn left or right at the intersection if brake pressure is equal to or larger than a predetermined amount. On the other hand, when the speed V of the vehicle is lower than the reference speed V0, the course estimation section 23 may estimate the course of the vehicle on the basis of whether a brake operation is performed or the accelerator is in an OFF state. Specifically, when the speed V of the vehicle is lower than the reference speed V0, the course estimation section 23 estimates that the vehicle will turn left or right at the intersection if the brake pressure is equal to or larger than a predetermined amount or if the accelerator opening is equal to or smaller than a predetermined value. That is, when the speed V of the vehicle is lower than the reference speed V0, the course estimation section 23 sets the criteria of determination regarding the presence of a deceleration operation to be less strict than in the case where the speed V of the vehicle is higher than the reference speed V0.

In addition, the course estimation section 23 may also estimate the course of the vehicle on the basis of the amount of steering of the vehicle. Specifically, the course estimation section 23 estimates that the vehicle will turn left or right when a temporal change of the steering angle equal to or larger than a predetermined threshold value. In addition, the course estimation section 23 can acquire the temporal change of the steering angle on the basis of an output from a steering angle sensor (not shown).

The vehicle course estimation ECU 20 outputs a course information signal, which indicates the course of the vehicle estimated by the course estimation section 23, to the driving assistance ECU 30.

Returning to the explanation of FIG. 1, the driving assistance ECU 30 executes driving assistance according to the course information signal output from the vehicle course estimation ECU 20. The driving assistance ECU 30 generates a control signal for performing driving assistance according to the course information signal output from the vehicle course estimation ECU 20 and outputs the control signal to the information providing unit 31 and the vehicle control unit 32. For example, when a course information signal regarding right turn is transmitted from the vehicle course estimation ECU 20, the driving assistance ECU 30 supports driving of a driver by displaying on the information providing unit 31 the information on the opposite vehicle detected by a vehicle detector (not shown) so that the information is notified to the driver.

The information providing unit 31 is a display, a speaker, or the like installed in a vehicle, and notifies the driver of various kinds of information according to the control signal output from the driving assistance ECU 30.

The vehicle control unit 32 controls traveling of a vehicle automatically according to the control signal output from the driving assistance ECU 30. The vehicle control unit 32 is a brake actuator or an accelerator actuator, for example.

Figure 3:
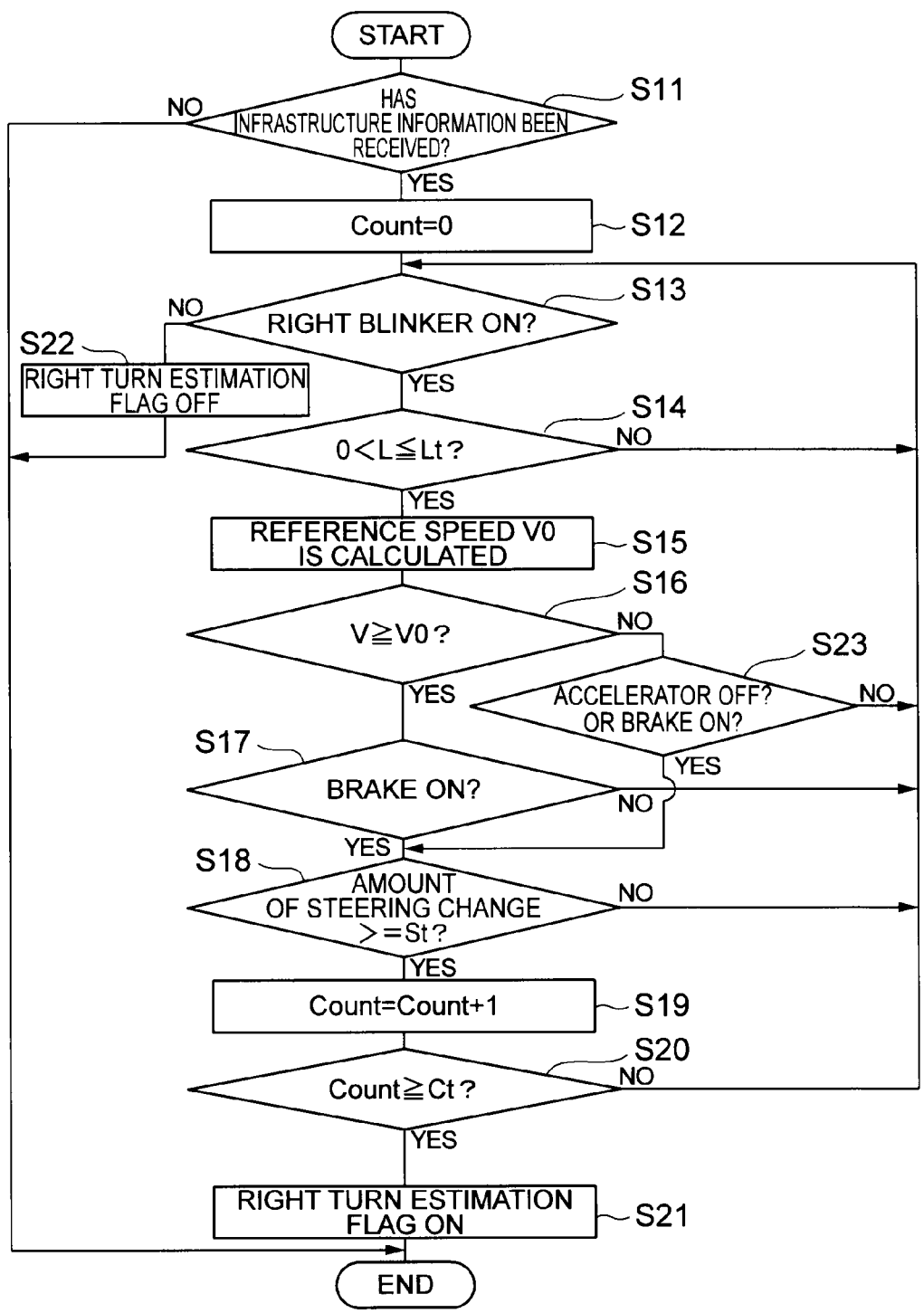
FIG. 3 is a flow chart showing an operation of the vehicle course estimation device related to the first embodiment.

Next, an operation of the vehicle course estimation device 1 related to the present embodiment will be described. FIG. 3 is a flow chart showing the operation of the vehicle course estimation device 1 related to the present embodiment. The process shown in FIG. 3 is repeatedly executed at predetermined intervals from the timing when a power source of the vehicle course estimation device 1 is turned on, for example. In addition, in the flow chart shown in FIG. 3, it is estimated whether or not to turn right at the intersection as the course of the vehicle.

First, the vehicle course estimation ECU 20 determines whether or not the infrastructure information transmitted from the road-to-vehicle communication device T through the road-to-vehicle communication unit 11 has been received (S11). When the infrastructure information has been received, the counter value Count is initialized (S12). On the other hand, when the infrastructure information has not been received, the vehicle course estimation processing is ended.

Then, the vehicle course estimation ECU 20 determines whether or not a right blinker is in an ON state on the basis of the output of the direction indicator sensor 14 (S13). When it is determined that the right blinker is ON in S13, the vehicle course estimation ECU 20 detects the distance L between the vehicle and the intersection, which is located at the travel direction side of the vehicle, using the distance detection section 21, and determines whether or not the distance L is larger than 0 and equal to or smaller than the predetermined distance Lt (S14).

When it is determined that the distance L is larger than 0 and equal to or smaller than the predetermined distance Lt in S14, the reference speed calculation section 22 calculates the reference speed V0 from Expression (1) (S15). Then, the course estimation section 23 determines whether or not the vehicle speed V acquired from the vehicle speed sensor 13 is equal to or higher than the reference speed V0 (S16).

When it is determined that the vehicle speed V is equal to or higher than the reference speed V0 in S16, the course estimation section 23 determines whether or not a brake operation is performed (S17). When it is determined that a brake operation is performed in S17, the course estimation section 23 determines whether or not a temporal change of the steering angle is equal to or larger than a predetermined threshold value St (S18).

When it is determined that the temporal change of the steering angle is equal to or larger than the predetermined threshold value St in S18, the vehicle course estimation ECU 20 adds 1 to the counter value Count (S19). Then, the vehicle course estimation ECU 20 determines whether or not the counter value is equal to or larger than a predetermined value Ct (S20).

When it is determined that the counter value is equal to or larger than the predetermined value Ct in S20, the course estimation section 23 sets a right turn estimation flag to ON (S21).

In addition, when it is determined that the right blinker is not ON in S13, the course estimation section 23 sets the right turn estimation flag to OFF (S22) to end the course estimation processing. When it is determined that the vehicle speed V is smaller than the reference speed V0 in S16, the vehicle course estimation ECU 20 determines whether an accelerator pedal is not pressed down or a brake operation is performed (S23). When the vehicle course estimation ECU 20 determines that the accelerator pedal is not pressed down or the brake operation is performed in S23, the process proceeds to S18.

When it is determined that the distance L is equal to or smaller than 0 and larger than the predetermined distance Lt in S14, when it is determined that the brake operation is not performed in S17, and when it is determined that the temporal change of the steering angle is smaller than the predetermined threshold value St in S18, the process proceeds to S13. In addition, when it is determined that the counter value is smaller than the predetermined value Ct in S20 and when it is determined that the accelerator pedal is pressed down and the brake operation is not performed in S23, the process proceeds to S13.

Figure 4:
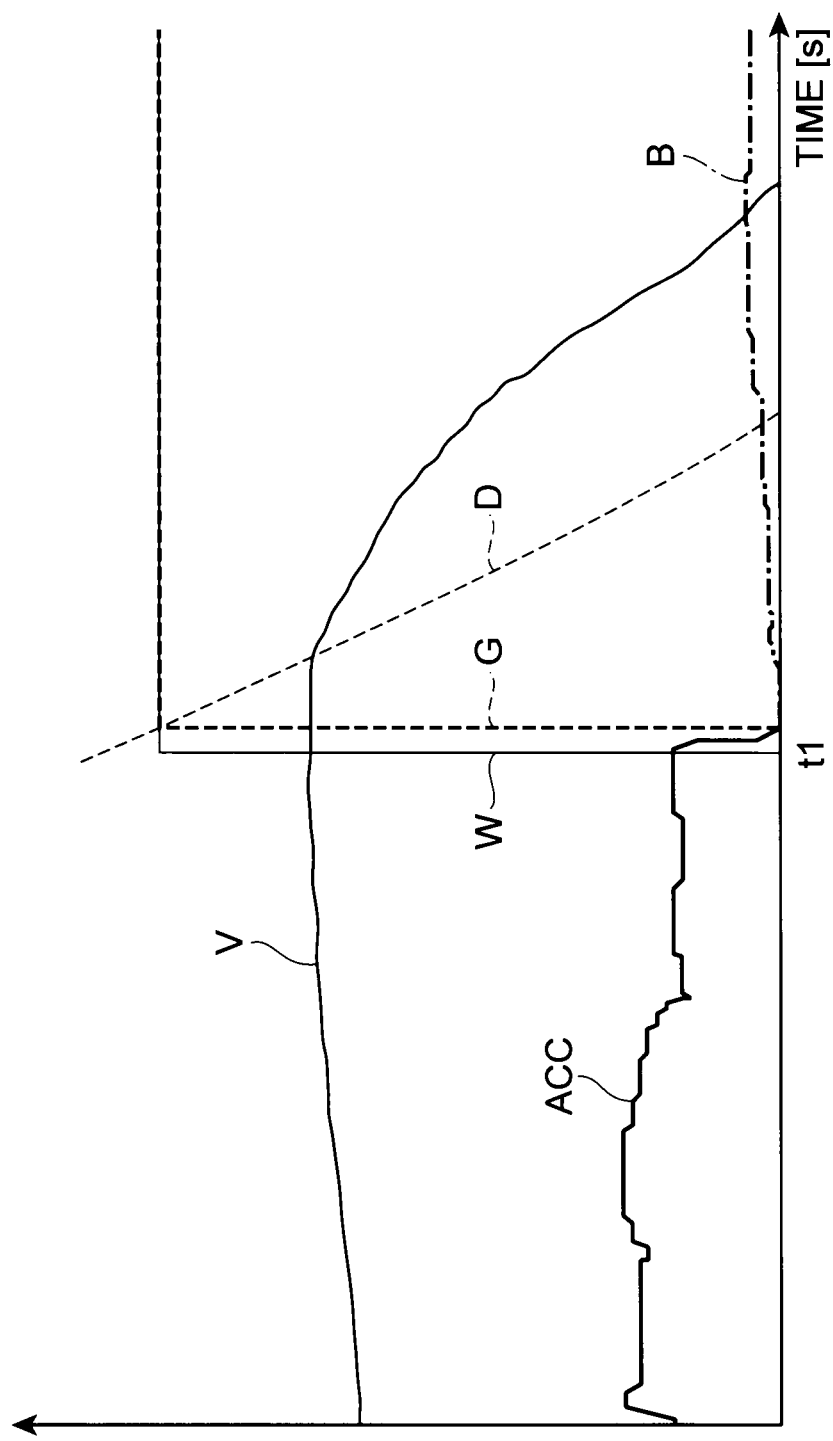
FIG. 4 is an example of an output result of the vehicle course estimation device related to the first embodiment when a vehicle turns right at the intersection.
Figure 5:
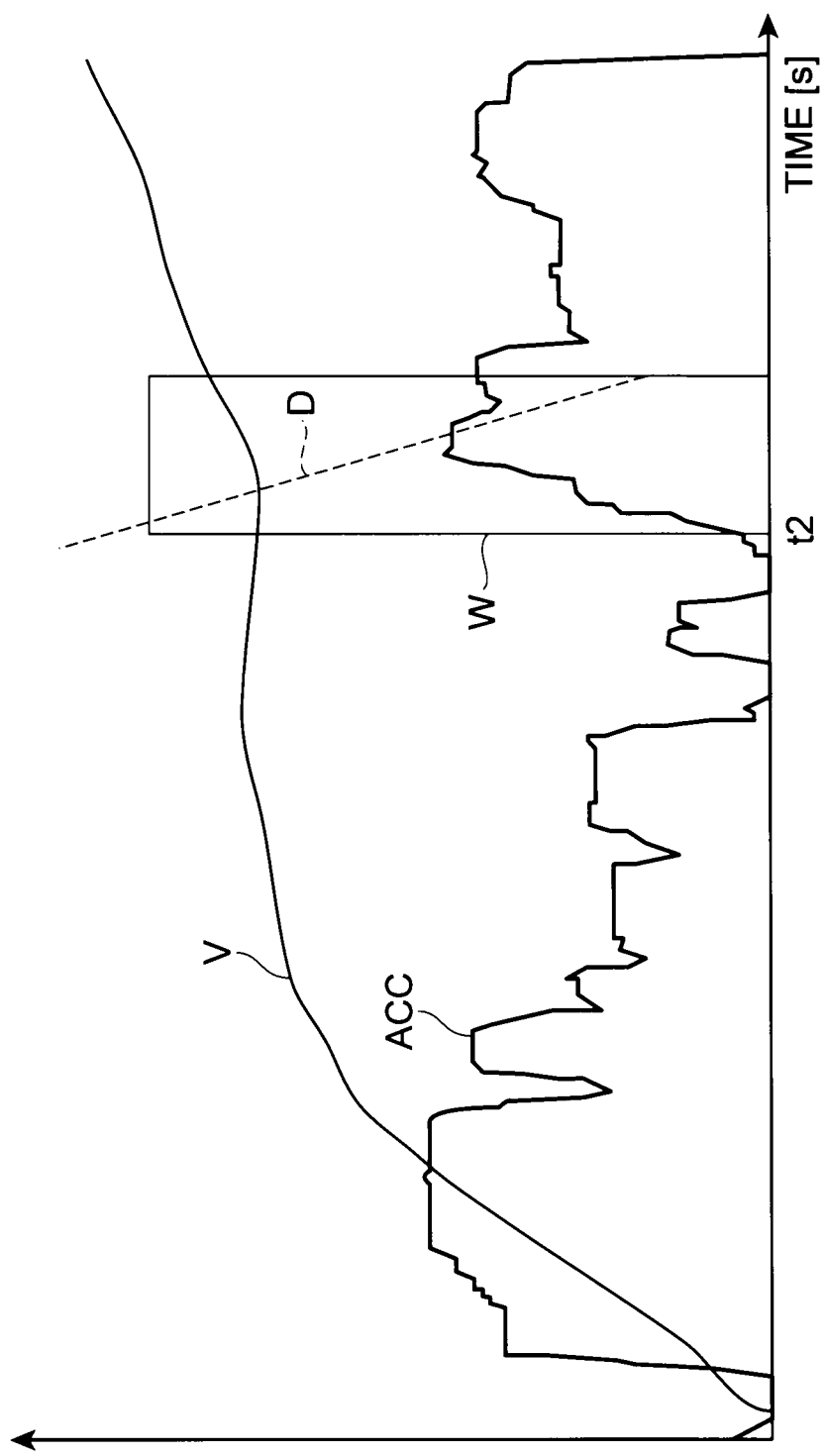
FIG. 5 is an example of an output result of the vehicle course estimation device related to the first embodiment when a vehicle changes lanes.

FIG. 4 shows time-series changes in the speed V of a vehicle, accelerator opening ACC, brake pressure B, a blinker operating state W, and a remaining distance D to an intersection when the vehicle turns right at the intersection and a vehicle course estimation result G of the vehicle course estimation device 1. FIG. 5 shows time-series changes in the speed V of a vehicle, the accelerator opening ACC, the brake pressure B, the blinker operating state W, and the remaining distance D to the intersection when the vehicle changes lanes and the vehicle course estimation result G of the vehicle course estimation device 1. In the graph shown in FIG. 4, the horizontal axis indicates a time and the vertical axis indicates a detected output value. Here, the rising state of the graph of the blinker operating state W shown in FIGS. 4 and 5 indicates a state where the blinker is turned on, and the rising state of the graph of the vehicle course estimation result G indicates a state where the right turn flag is set.

In the example shown in FIG. 4, the accelerator opening ACC is decreased when the blinker operating state W is turned on at time t1. Accordingly, the vehicle course estimation device 1 estimates a right turn as the course of the vehicle. On the other hand, in the example shown in FIG. 5, the accelerator opening ACC is increased when the blinker operating state W is turned on at time t2. Accordingly, the vehicle course estimation device 1 does not estimate a right turn as the course of the vehicle. Moreover, in FIGS. 4 and 5, it is assumed that the vehicle speed V when the blinker operating state W is turned on is lower than the reference speed V0.

According to the vehicle course estimation device 1 related to the present embodiment, the course of a vehicle is estimated on the basis of the speed V of the vehicle with respect to the reference speed V0 which is a speed for the vehicle to arrive at the intersection after a predetermined time τ. Since the course which a vehicle can take is limited according to the reference speed V0, it is possible to accurately estimate the course of the driver by estimating the course of the vehicle on the basis of the speed V of the vehicle with respect to the reference speed V0.

(Second Embodiment)

Figure 6:
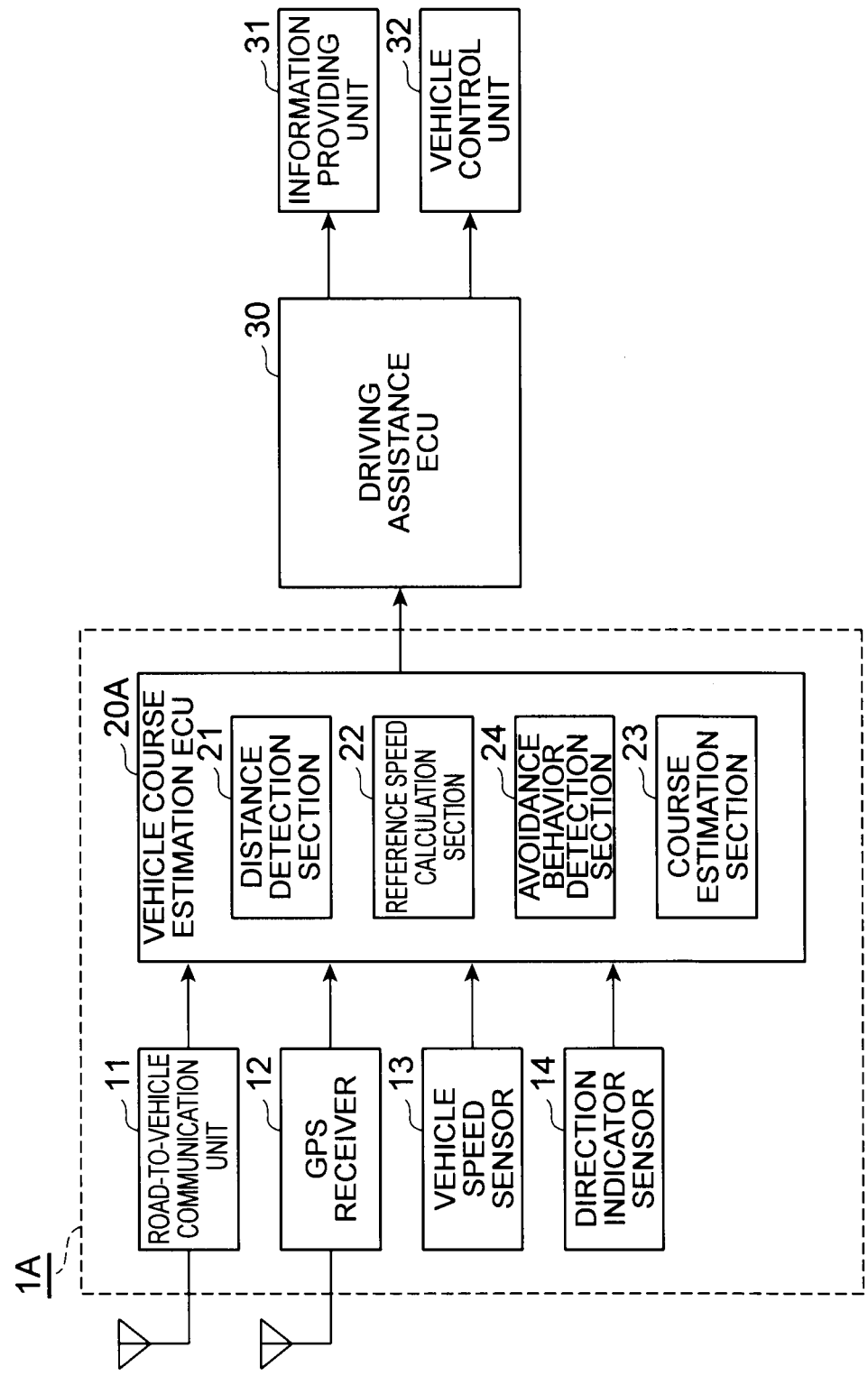
FIG. 6 is a block diagram of a vehicle course estimation device related to a second embodiment.

Next, a vehicle course estimation device related to a second embodiment will be described. As shown in FIG. 6, a vehicle course estimation device 1A related to the second embodiment includes a vehicle course estimation ECU 20A instead of the vehicle course estimation ECU 20. The vehicle course estimation ECU 20A is different from the vehicle course estimation ECU 20 in that an avoidance behavior detection section 24 is provided in addition to the distance detection section 21, the reference speed calculation section 22, and the course estimation section 23. In addition, the vehicle course estimation ECU 20A is different from the vehicle course estimation ECU 20 in that the course estimation section 23 estimates the course of a vehicle on the basis of not only the speed V of the vehicle with respect to the reference speed V0 but also whether or not an operation of a direction indicator of the vehicle is an operation to avoid another vehicle. Hereinafter, explanation regarding the same or similar matters as in the first embodiment will be omitted.

The avoidance behavior detection section 24 functions as avoidance behavior detection means for detecting whether or not the operation of the direction indicator of the vehicle detected by the direction indicator sensor 14 is an operation to avoid another vehicle. Specifically, the avoidance behavior detection section 24 detects whether or not the operation of the direction indicator of the vehicle is an operation to avoid another vehicle, which interrupts the traveling of the vehicle, on the basis of the position of another vehicle and the position of the vehicle when the operation of the direction indicator of the vehicle is detected by the direction indicator sensor 14.

The course estimation section 23 functions as course estimation means for estimating the course of a vehicle. The course estimation section 23 estimates the course of a vehicle by determining whether or not the vehicle is in a physically possible state for turning at the intersection and whether or not the vehicle is doing action trying to transition to the turning state on the basis of the speed of the vehicle with respect to the reference speed calculated by the reference speed calculation section 22. In addition, the course estimation section 23 in the vehicle course estimation device 1A related to the present embodiment estimates that the vehicle will not change the travel direction at the intersection when the avoidance behavior detection section 24 detects that the operation of the direction indicator of the vehicle is an operation to avoid another vehicle.

Figure 7:
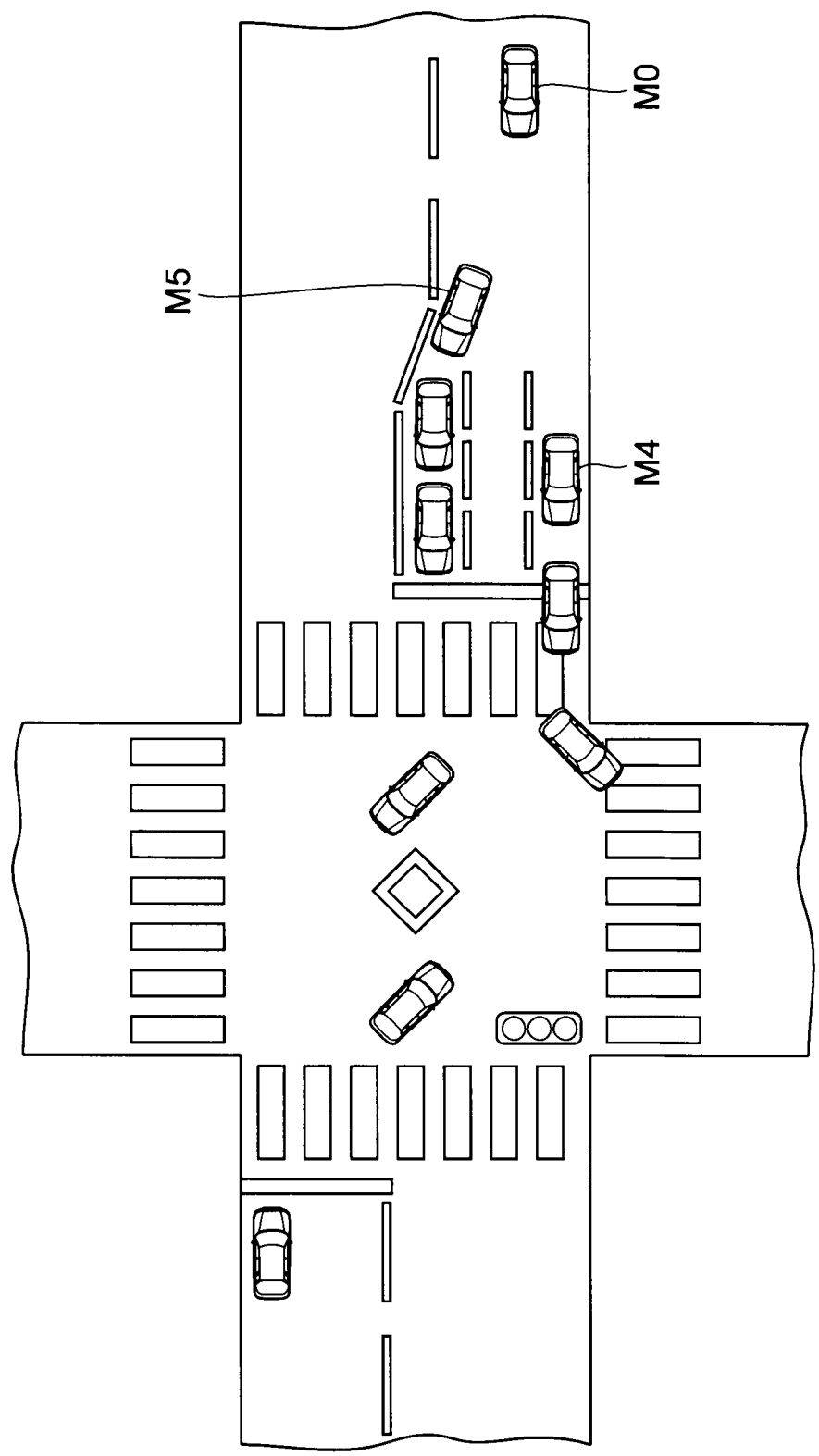
FIG. 7 is a view for explaining the scene where the vehicle course estimation device related to the second embodiment is applied.

Referring to FIG. 7, an example of the scene where the vehicle course estimation device 1A related to the present embodiment is applied will be described. FIG. 7 shows a state where a vehicle M4 has stopped to wait for left turn and a vehicle M5 has stopped off the right turn lane for right turn waiting at the intersection. In this case, a vehicle M0 trying to go straight needs to travel while operating a direction indicator indicating the right or the left in order to avoid the vehicle M4 or M5. The vehicle course estimation device 1A determines that the operation of the direction indicator in such a scene does not mean left or right turn at the intersection but means a lane change by estimating the course of the vehicle M0 on the basis of whether or not the operation of the direction indicator of the vehicle M0 is an operation to avoid the vehicle M4 or M5.

That is, for example, even if the course estimation section 23 estimates that the vehicle will turn right at the intersection on the basis of the speed V0 of the vehicle with respect to the reference speed V0, the course estimation section 23 does not estimate the travel direction of the vehicle M0 as right turn when the avoidance behavior detection section 24 detects that the operation of the direction indicator of the vehicle M0 is an operation to avoid another vehicle.

Figure 8:
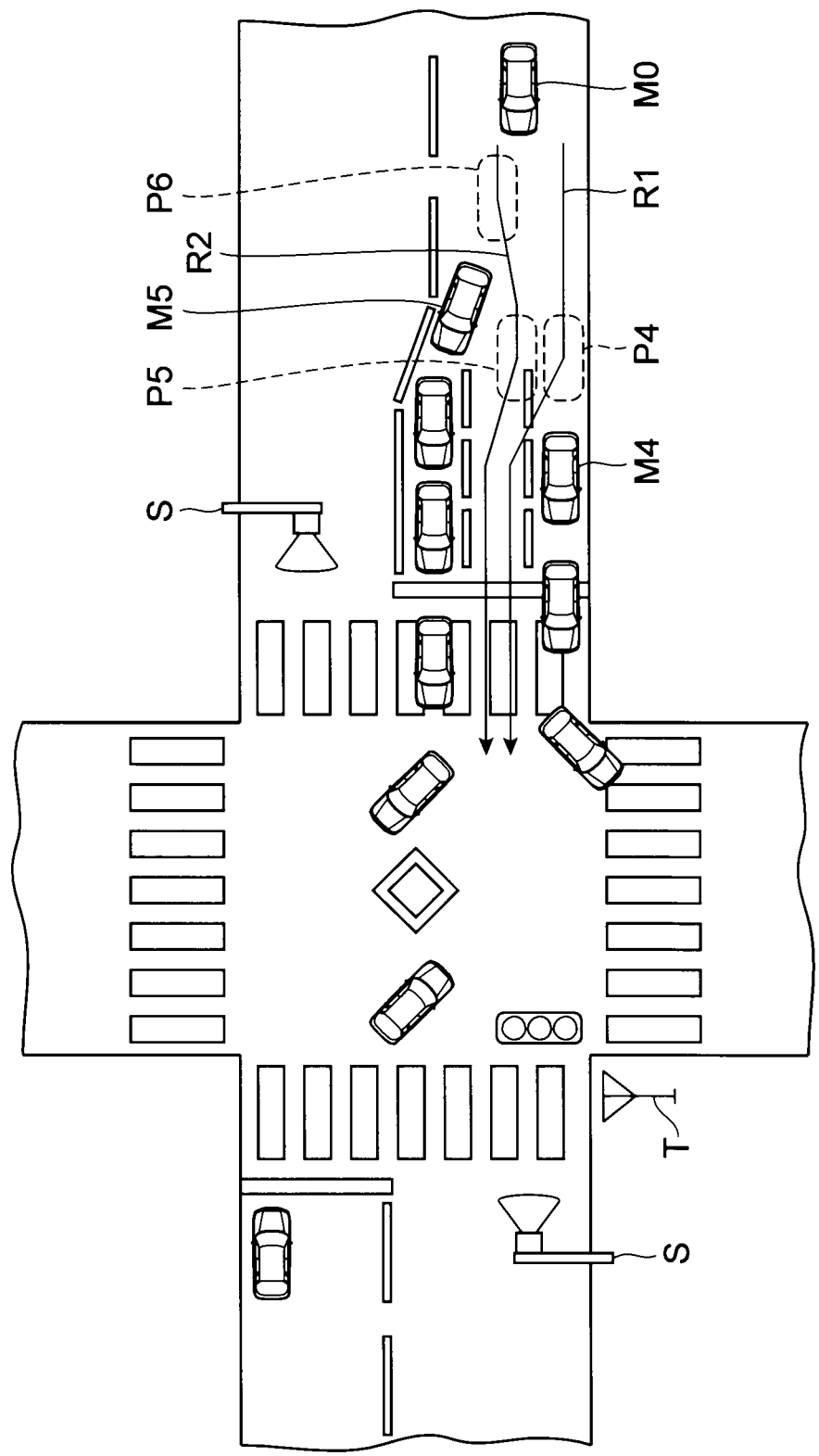
FIG. 8 is a view for explaining the scene where the vehicle course estimation device related to the second embodiment is applied.

A method of estimating the vehicle course by the vehicle course estimation device 1A related to the present embodiment will be described using a specific example. FIG. 8 shows a state where the vehicle M4 has stopped to wait for left turn and the vehicle M5 has stopped off the right turn lane for right turn waiting at the intersection. When the vehicle M0 goes straight while avoiding the vehicle M4, it may be considered that the vehicle M0 travels along the trajectory R1. When the vehicle M0 travels along the trajectory R1, it is expected that the vehicle M0 will change lanes by operating the right blinker near the position P4 behind the vehicle M4. When the vehicle M0 goes straight while avoiding the vehicle M5, it may be considered that the vehicle M0 travels along the trajectory R2. When the vehicle M0 travels along the trajectory R2, it is expected that the vehicle M0 will change lanes by operating the right blinker near the position P5 immediately after passing the vehicle M5.

The vehicle course estimation device 1A detects the position information of the vehicles M4 and M5 which are vehicles present near the intersection detected by the vehicle detection sensor S through the road-to-vehicle communication unit 11 and the road-to-vehicle communication device T. In addition, the vehicle course estimation device 1A acquires the position information of the vehicle M0 using the road-to-vehicle communication unit 11 or the GPS receiver 12.

In addition, the vehicle course estimation device 1A may detect traveling states of the detected vehicles M4 and M5. As examples of the traveling state, a right turn waiting state, a left turn waiting state, a parking state, and the like are detected. For example, it is possible to detect the traveling state according to a detected operating state of a direction indicator of another vehicle after detecting the operating state of the direction indicator of another vehicle using the vehicle detection sensor S. In addition, a traveling state of another vehicle may be detected on the basis of the travel lane of another vehicle detected by the vehicle detection sensor S. In addition, the position information and the traveling state of another vehicle may also be detected by a sensor (not shown), such as a camera installed in the vehicle.

In addition, the avoidance behavior detection section 24 detects whether or not the operation of the direction indicator is an operation to avoid another vehicle on the basis of the detected position information of another vehicle and the position information of the vehicle when the operation of the direction indicator of the vehicle is detected by the direction indicator sensor 14.

Specifically, when the vehicle M4 is detected as a parked vehicle or a vehicle waiting for left turn and the vehicle M0 turns on the right blinker near the position P4 behind the vehicle M4, the avoidance behavior detection section 24 determines that the operation of the direction indicator of the vehicle M0 is an operation to avoid the vehicle M4. Then, the course estimation section 23 estimates that the vehicle M0 will not turn right at the intersection located at the travel direction side. In addition, when the vehicle M5 is detected as a parked vehicle or a vehicle waiting for right turn and the vehicle M0 turns on the right blinker near the position P5 immediately after passing the vehicle M5, the avoidance behavior detection section 24 determines that the operation of the direction indicator of the vehicle M0 is an operation to avoid the vehicle M5. Then, the course estimation section 23 estimates that the vehicle M0 will not turn right at the intersection located at the travel direction side.

In addition, the avoidance behavior detection section 24 may detect whether or not the operation of the direction indicator of the vehicle M0 is an operation to avoid the vehicle M4 without acquiring the position information and the traveling state of a vehicle present near the intersection. It is expected that a vehicle waiting for right turn is present near the position at which the right turn lane starts. Therefore, when the position at which the right turn lane starts is acquired from the road-to-vehicle communication device T and a left blinker is turned on near the position P6 before the right turn lane starting position and a right blinker is turned on near the position P5 after passing the right turn lane starting position, the avoidance behavior detection section 24 determines that the operation of the direction indicator of the vehicle M0 is an operation to avoid another vehicle. Then, the course estimation section 23 may estimate that the vehicle M0 will not turn right at the intersection located at the travel direction side.

Figure 9:
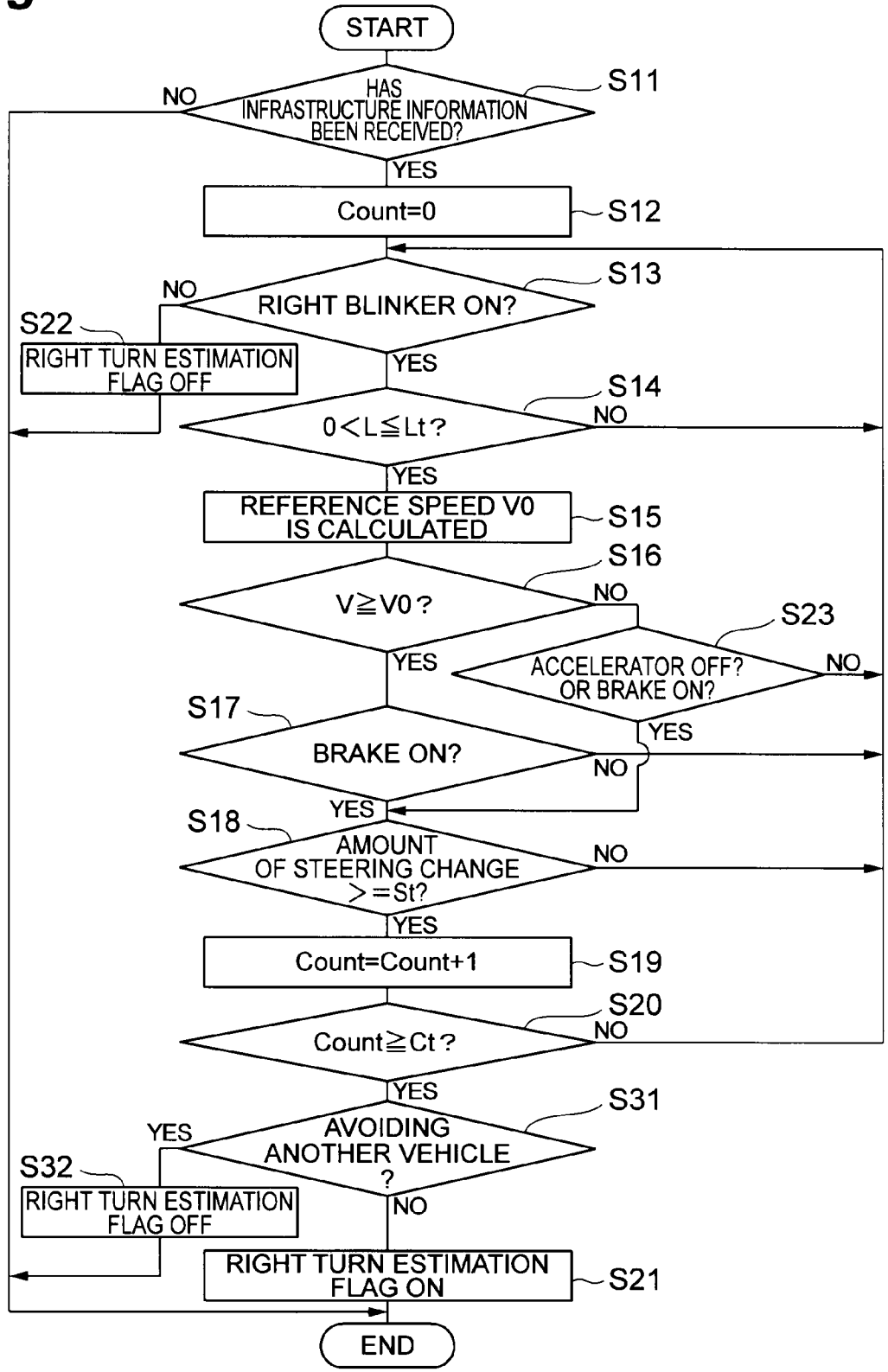
FIG. 9 is a flow chart showing an operation of the vehicle course estimation device related to the second embodiment.

Next, an operation of the vehicle course estimation device 1A related to the present embodiment will be described. FIG. 9 is a flow chart showing the operation of the vehicle course estimation device 1A related to the present embodiment. The process shown in FIG. 9 is repeatedly executed at predetermined intervals from the timing when a power source of the vehicle course estimation device 1A is turned on, for example. In addition, in the flow chart shown in FIG. 9, it is estimated whether or not to turn right at the intersection as the course of the vehicle. Since the processing excluding S31 and S32 in FIG. 9 is the same as the processing of S11 to S23 in the first embodiment, explanation thereof will be omitted.

In the vehicle course estimation device 1A related to the present embodiment, when it is determined that the counter value is equal to or larger than the predetermined value Ct in S20, the avoidance behavior detection section 24 determines whether or not the operation of the right blinker of the vehicle is an operation to avoid another vehicle (S31).

When it is determined that the operation of the right blinker of the vehicle is not an operation to avoid another vehicle in S31, the course estimation section 23 sets the right turn estimation flag to ON (S21). On the other hand, when it is determined that the operation of the right blinker of the vehicle is an operation to avoid another vehicle in S31, the course estimation section 23 sets the right turn estimation flag to OFF (S32) to end the course estimation processing.

Also in the vehicle course estimation device 1A related to the present embodiment, the course of a vehicle is estimated on the basis of the vehicle speed V with respect to the reference speed V0 which is a speed for the vehicle to arrive at the intersection after a predetermined time τ, similar to the vehicle course estimation device 1 related to the first embodiment. Since the course which a vehicle can take is limited according to the reference speed V0, it is possible to accurately estimate the course of the driver by estimating the course of the vehicle on the basis of the reference speed V0.

In addition, according to the vehicle course estimation device 1A related to the present embodiment, it is determined whether or not a vehicle is doing avoidance action on the basis of the position of another vehicle and the position of the vehicle when the operation of the direction indicator is detected. When passing another vehicle, the direction indicator tends to operate when both vehicles are in the predetermined positional relationship. Thus, it is possible to appropriately detect whether or not a vehicle is doing avoidance action by using the position of another vehicle and the position of the vehicle when the operation of the direction indicator is detected.

In addition, in the vehicle course estimation device 1A related to the present embodiment, the course estimation section 23 estimates that a vehicle will not change the travel direction at the intersection when the avoidance behavior detection section 24 detects that the operation of the direction indicator of the vehicle is an operation to avoid another vehicle other than the vehicle. Thus, by not estimating the operation of the direction indicator for avoiding another vehicle as a travel-direction change at the intersection, estimating the avoidance behavior of another vehicle and the course change at the intersection incorrectly can be prevented. As a result, the course of the vehicle can be accurately estimated.

Moreover, in the present embodiment, an example of the vehicle course estimation device 1 related to the present invention is shown. The vehicle course estimation device 1 related to the present invention is not limited to the vehicle course estimation device 1 related to the present embodiment, and the vehicle course estimation device 1 related to the present embodiment may be modified or applied to other apparatuses without departing from the scope of the present invention as defined in the appended claims.

For example, in the second embodiment, the course of a vehicle is estimated by determining whether or not the vehicle is in a physically possible state for turning at the intersection on the basis of the speed V of the vehicle with respect to the reference speed V0 and then determining whether or not the operation of the direction indicator of the vehicle is an operation to avoid another vehicle. However, they may be independently configured. That is, in the driving course estimation device 1A, it is also possible to estimate the course of a vehicle on the basis of only whether or not the operation of the direction indicator of the vehicle is an operation to avoid another vehicle without performing vehicle course estimation based on the speed V of the vehicle with respect to the reference speed V0.

In addition, although the example of estimating whether or not to turn right at the intersection as the course of the vehicle has been described in the above embodiment, it is also possible to estimate the course of another vehicle. For example, turning left or going straight of a vehicle at the intersection may be estimated as the course of the vehicle on the basis of the reference speed V0.

REFERENCE SIGNS LIST

1: vehicle course estimation device 1
11: road-to-vehicle communication unit
12: GPS receiver
13: vehicle speed sensor
14: direction indicator sensor
20: vehicle course estimation ECU
21: distance detection section
22: reference speed calculation section
23: course estimation section
24: avoidance behavior detection section
30: driving assistance ECU
31: information providing unit
32: vehicle control unit

The invention claimed is:

1. A vehicle course estimation device comprising:
    direction indicator detection means for detecting an operating state of a direction indicator of a vehicle;
    distance detection means for detecting a distance between the vehicle and an intersection located at a travel direction side of the vehicle;
    reference speed calculation means for calculating a reference speed, which is a speed for the vehicle to arrive at the intersection after a predetermined time, on the basis of the distance between the vehicle and the intersection located at the travel direction side of the vehicle, which has been detected by the distance detection means, when an operation of the direction indicator is detected by the direction indicator detection means;
    course estimation means for estimating a course of the vehicle on the basis of a speed of the vehicle with respect to the reference speed calculated by the reference speed calculation means; and
    vehicle control means for automatically controlling a travel of the vehicle based upon the estimated course of the vehicle,
    wherein when the operation of the direction indicator is detected by the direction indicator detection means, the reference speed calculation means calculates the reference speed on the basis of the distance between the vehicle and the intersection located at the travel direction side of the vehicle, which has been detected by the distance detection means, and a fixed time set in advance as the predetermined time.

2. The vehicle course estimation device according to claim 1,
    wherein the course estimation means estimates the course of the vehicle on the basis of presence of a deceleration operation of the vehicle and sets determination conditions in determining the presence of the deceleration operation of the vehicle according to the speed of the vehicle with respect to the reference speed.

3. The vehicle course estimation device according to claim 1,
    wherein the course estimation means estimates a travel direction of the vehicle at the intersection as the course of the vehicle.

4. The vehicle course estimation device according to claim 3,
    wherein when the speed of the vehicle is lower than the reference speed, the course estimation means sets the determination conditions such that determination that a deceleration operation is performed is made more easily than in a case where the speed of the vehicle is not lower than the reference speed.

5. The vehicle course estimation device according to claim 2,
    wherein the course estimation means also estimates the course on the basis of the amount of steering of the vehicle.

6. A vehicle course estimation device comprising:
    circuitry configured to:
        detect an operating state of a direction indicator of a vehicle;
        detect a distance between the vehicle and an intersection located at a travel direction side of the vehicle;
        calculate a reference speed, which is a speed for the vehicle to arrive at the intersection after a predetermined time, on the basis of the distance between the vehicle and the intersection located at the travel direction side of the vehicle, when an operation of the direction indicator is detected;
        estimate a course of the vehicle on the basis of a speed of the vehicle with respect to the calculated reference speed; and
        automatically control a travel of the vehicle based upon the estimated course of the vehicle,
    wherein when the operation of the direction indicator is detected, the circuitry calculates the reference speed on the basis of the detected distance between the vehicle and the intersection located at the travel direction side of the vehicle and a fixed time set in advance as the predetermined time.

7. The vehicle course estimation device according to claim 6,
    wherein the circuitry is configured to estimate the course of the vehicle on the basis of presence of a deceleration operation of the vehicle and sets determination conditions in determining the presence of the deceleration operation of the vehicle according to the speed of the vehicle with respect to the reference speed.

8. The vehicle course estimation device according to claim 7,
    wherein when the speed of the vehicle is lower than the reference speed, the circuitry sets the determination conditions such that determination that a deceleration operation is performed is made more easily than in a case where the speed of the vehicle is not lower than the reference speed.

9. The vehicle course estimation device according to claim 7,
    wherein the circuitry is configured to estimate the course on the basis of an amount of steering of the vehicle.

10. The vehicle course estimation device according to claim 6,
    wherein the circuitry is configured to estimate a travel direction of the vehicle at the intersection as the course of the vehicle.

* * * * *